United States Patent Office 3,825,503
Patented July 23, 1974

3,825,503
HYDROGEN TRANSFER CATALYST
Ralph E. Patrick, Flatwoods, and Ronald A. Kmecak and Stephen M. Kovach, Ashland, Ky., assignors to Ashland Oil, Inc., Ashland, Ky.
No Drawing. Original application Oct. 22, 1968, Ser. No. 769,737, now Patent No. 3,686,340. Divided and this application June 15, 1972, Ser. No. 263,216
Int. Cl. B01j 11/08, 11/22
U.S. Cl. 252—462                3 Claims

ABSTRACT OF THE DISCLOSURE

A novel catalyst system including an active metal oxide selected from the group consisting of noble metals and nickel; a promoter selected from the group consisting of tin and lead; if desired, a second promoter selected from the group consisting of alkali metals, such as potassium, rubidium, cesium, etc., an alkaline earth metal, such as calcium, strontium, barium, etc., and a rare earth metal, such as cerium, thorium, etc.; and an inert oxide support, such as alumina. The subject catalysts are utilized in the hydrodealkylation of alkyl aromatics, etc., in the dehydrogenation of paraffins and the like, and in the dehydrogenation-desulfurization of sulfur- and nitrogen-contaminated hydrocarbon materials.

BACKROUND OF THE INVENTION

This is a division of application Ser. No. 769,737 filed Oct. 22, 1968 now U.S. Pat. 3,686,340.

The present invention relates to novel catalyst compositions, particularly useful for the catalysis of hydrogen transfer reactions and novel processes for the utilization of such catalysts. In a more specific aspect, the present invention relates to novel catalyst compositions particularly useful for the conduct of hydrodealkylation reactions, dehydrogenation reactions, and hydrogenation-hydrotreating reactions, and such reactions utilizing these catalysts.

In recent years, the demand for hydrocarbon fuels and chemicals derived from hydrocarbons has increased at such a rapid rate and the domestic supply of petroleum crude oils had diminished to the point that it has become necessary to convert low grade petroleum crude oils to fuels and chemicals, to upgrade refinery streams not heretofore utilized for high grade fuels and chemicals and to utilize hydrocarbon liquids, also usually of low grade, derived from coal by carbonization and solvent extraction, from oil shales, and from tar sands. One of the primary operations for the upgrading of low grade hydrocarbons is a group of reactions involving changing the carbon to hydrogen ratio or displacing a substituent group with hydrogen. The change in the carbon to hydrogen ratio may be effected by dehydrogenation as, for example, in the dehydrogenation of paraffins to corresponding mono-olefins, in the dehydrogenation of paraffins and mono-olefins to diolefins; or in the dehydrogenation of paraffins or cycloparaffins to aromatics, or the change may be effected by hydrogenation as, for example, in the hydrogenation of diisobutylene to isooctane and in the hydrogenation of unsaturated polymer gasoline into motor fuels of less unsaturated character and the like. In certain instances, such changes in the carbon to hydrogen ratio may be accompanied to some extent by isomerization type reactions, such as those involved in the cyclization of paraffinic hydrocarbons, such as the conversion of hexane to benzene, etc. In some instances, also, the hydrogen displaces substituent groups, particularly substituent groups of cyclic hydrocarbons; for example, in the dealkylation of alkyl aromatics, etc. Destructive conversion of organic sulfur and nitrogen compounds found in some hydrocarbon materials and the saturation of highly unsaturated materials may also be effected.

One particularly useful reaction of this type is the hydrodealkylation of alkyl aromatics to convert toluene to benzene, and coal tar light oils and coal tar methyl naphthalene to benzene and naphthalene, respectively. The thermal version of this process requires extremely high temperatures and pressures. The catalytic process generally employs a chromia-magnesia catalyst deposited on an alumina base, but, in spite of the effectiveness of this catalyst, it requires high temperatures, high hydrogen pressures and suffers from low yields, low selectivity and rapid degeneration of the catalyst.

Another highly valuable reaction of this character is a dehydrogenation process which converts paraffins to olefins. etc. While several processes have been developed for this purpose, these processes have very short on-stream times, they are cyclic, adiabatic, fixed-bed operations and necessitate frequent regeneration of the catalyst due to carbon lay-down and catalyst fouling. Catalyst deactivation is also quite prounounced.

Another process of extreme importance when dealing with low grade hydrocarbon liquids, particularly those containing substantial volumes of sulfur and nitrogen and their compounds is the hydrogenation-hydrotreating of such materials. While certain catalysts have heretofore been developed for this type of operation, none appear to have qualities necessary to simultaneously desulfurize and denitrogenate the crudes and add hydrogen to the aromatic and olefinic compounds contained in the feed materials. In other words, some catalysts have heretofore been useful in desulfurizing and denitrogenating but are highly ineffective for the hydrogenation portion of the reaction; whereas, those useful for hydrogenation are readily poisoned by the desulfurization and denitrogenation. Again, in this area of operation, there is a tendency for the catalyst to rapidly degenerate and become coked, thereby losing its activity quite rapidly.

It is therefore an object of the present invention to provide an improved catalyst for overcoming substantially all of the above mentioned difficulties. In a more specific aspect, the present invention relates to a novel catalyst system for carrying out hydrogen transfer reactions. Still another object of the present invention is to provide an improved catalyst system for hydrogen transfer reactions which requires relatively low temperatures. Another object of the present invention is to provide an improved catalyst system for hydrogen transfer reactions which requires relatively low hydrogen pressures. Another object of the present invention is to provide an improved catalyst system for hydrogen transfer reactions which produce high product yields. Another and further object of the present invention is to provide an improved catalyst system for hydrogen transfer reactions which exhibits a high selectivity to the desired reaction. Yet another object of the present invention is to provide an improved catalyst system for hydrogen transfer reactions which is highly resistant to coking. Another object of the present invention is to provide an improved catalyst system and process for the hydrodealkylation of alkyl aromatics. Another and further object of the present invention is to provide an improved catalyst system and process for the dehydrogenation of paraffinic hydrocarbons. Still another object of the present invention is to provide an improved system and process for the hydrogenation-dehydrogenation of hydrocarbon materials contaminated with sulfur and nitrogen. These and other objects and advantages of the present invention will be apparent from the following description.

SUMMARY OF THE INVENTION

Briefly, in accordance with the present invention, the novel catalyst composition of the present invention includes an active metal of Group VIII selected from the group consisting of noble metals and nickel, a promoter of a Group IV metal selected from the group consisting of tin and lead and an inert carrier material. More specifically, the noble metals of Group VIII, and nickel, in their oxide forms are deposited on an inert oxide carrier along with tin or lead in their oxide form. The catalysts are further improved by adding to the Group VIII and Group IV metals an alkali metal, an alkaline earth metal, or a rare earth metal as a second promoter. Novel hydrogen transfer reactions utilizing the above catalytic materials are also taught herein.

The novel catalysts of the present invention include a Group VIII metal in its oxide form, including specifically ruthenium, rhodium, palladium and platinum of the noble metal group, and nickel from the non-noble metal or ferrous group of Group VIII. The promoter from Group IV particularly includes tin and lead oxides. Where a second promoter is utilized, a metal or mixture of metals selected from the group consisting of alkali metals, alkaline earth metals and rare earth metals may be utilized. These materials are also in their oxide forms and include potassium, rubidium, cesium, calcium, strontium, barium, cerium, thorium, and the like. The inert oxide support is preferably a gamma alumina, including the beta, eta, boehmite and bayerite, etc., crystalline forms. Other inert oxide supports include other aluminas, silica-alumina, silica, silica-magnesia, alumina-magnesia, silica-zirconia, etc.

In the preparation of the novel catalysts of the present invention, well-known techniques may be employed. These include, for example, coprecipitation and impregnation techniques. The base material may be an extrudate or pellet to be impregnated or a powder which is thereafter pelletized or extruded to yield the finished catalyst. The active metal portion of the catalyst and the promoters are added through the use of water-soluble salts such as their halides, nitrates, sulfates, acetates, etc. Easily hydrolyzed salts can be kept in solution without decomposition by employing an appropriate inorganic acid, for example, sulfuric acid for tin sulfate, hydrochloric acid for tin chloride, etc. Drying and calcination of the catalyst can be employed, for example vacuum drying, and calcination in oxidative, neutral or reductive atmospheres employing temperatures of about 800 to 1200° F.

The following examples are illustrative of accepted techniques for preparing the novel catalysts of the present application.

Example I

To 900 ml. of distilled water was added 40 g. of stannous sulfate and 15 ml. of concentrated sulfuric acid. The sulfuric acid was required to bring the insolubles from the stannous sulfate into solution. This was believed to be tin hydroxide. This solution was added to 900 ml. of a boehmite alumina as pellets and after contact for fifteen minutes, the unadsorbed liquid was decanted from the catalyst pellets. The resulting impregnated catalyst was dried at 250° F. for one hour and calcined in air at 950° F. in a muffle furnace for sixteen hours. This yielded a catalyst of the following composition:

$$2\% \text{ SnO}-\text{Al}_2\text{O}_3$$

A solution containing 150 ml. of distilled water and 2 g. of rhodium trichloride was added to 150 ml. of 2% SnO—Al$_2$O$_3$ pellets from above. Catalyst and solution was in contact for fifteen minutes and the unadsorbed liquid was decanted. The resulting catalyst was dried at 250° F. for one hour and calcined in air at 950° F. in a muffle furnace for sixteen hours. This yielded a catalyst of the following composition:

$$1\% \text{ Rh}-2\% \text{ SnO}-\text{Al}_2\text{O}_3$$

A solution containing 150 ml. of distilled water and 5.5 g. of cesium nitrate was added to 150 ml. of 1% Rh-2%SnO—Al$_2$O$_3$ pellets from above. Catalyst and solution was in contact for fifteen minutes and the unadsorbed liquid was decanted. The resulting catalyst was dried at 250° F. for one hour and calcined in air at 950° F. in a muffle furnace for sixteen hours. This yielded a catalyst of the following composition:

$$1\% \text{ Rh}-2\% \text{ Cs}_2\text{O}-2\% \text{ SnO}-\text{Al}_2\text{O}_3$$

Example II

By employing the techniques and procedures outlined in Example I, other catalytic compositions were prepared. A solution containing 150 ml. of distilled water and 67 g. of a 5% palladium (ous) chloride solution was added to 150 ml. of 2% SnO—Al$_2$O$_3$ pellets prepared in Example I. Drying and calcination yielded the following composition:

$$1\% \text{ Pd}-2\% \text{ SnO}-\text{Al}_2\text{O}_3$$

A solution containing 150 ml. of distilled water and 5.5 g. of cesium nitrate was added to 150 ml. of 1% Pd—2% SnO—Al$_2$O$_3$ pellets from above. Drying and calcination yielded the following composition:

$$1\% \text{ Pd}-2\% \text{ Cs}_2\text{O}-2\% \text{ SnO}-\text{Al}_2\text{O}_3$$

Example III

To 600 ml. of distilled water was added 54 g. of stannous sulfate and 20 ml. of concentrated sulfuric acid. The tin sulfate was partially insoluble and the sulfuric acid brought it into solution. This insolubility was probably due to the presence of tin hydroxide. This solution was added to 600 ml. of a boehmite alumina and after contact for fifteen minutes the unadsorbed liquid was decanted from the catalyst pellets. The resulting impregnated catalyst was dried at 250° F. for one hour and calcined at 950° F. in air in a muffle furnace for sixteen hours. This yielded a catalyst of the following composition:

$$4\% \text{ SnO}-\text{Al}_2\text{O}_3$$

A solution containing 150 ml. of distilled water and 4.5 g. of chloroplatinic acid was added to 150 ml. of 4% SnO—Al$_2$O$_3$ pellets (prepared as above) and allowed to remain in contact for fifteen minutes before decanting the unadsorbed liquid. The impregnated catalyst was dried at 250° F. for one hour and calcined in air at 950° F. for sixteen hours in a muffle furnace. This yielded a catalyst of the following composition:

$$1\% \text{ Pt}-4\% \text{ SnO}-\text{Al}_2\text{O}_3$$

Example IV

By employing the technique and procedure outlined in Example III, 1% Rh—4% SnO—Al$_2$O$_3$ and 1% Ru—4% SnO—Al$_2$O$_3$ were prepared by utilizing rhodium trichloride and ruthenium trichloride, respectively.

Optimum contents of the Group VIII metal include 0.5–5% by weight based on the finished catalyst, while the promoter concentration varies between 1 and 15% by weight.

As previously pointed out, the catalysts of the present application are particularly useful in carrying out the hydrodealkylation of alkyl aromatics to produce the parent aromatic hydrocarbons. Feedstocks for such process include toluene and polymethyl benzenes, coal tar light oils, coal tar methyl naphthalene concentrates, and bicyclic concentrates from light cycle oils and heavy reformates. Feedstock preparation can include fractionation to remove front ends or bottoms, thereby removing undesired fractions, such as unsaturates, indanes and resinous materials. The distillation may be preceded or followed by a hydrogenation-hydrotreating step. Feedstocks with or without sulfur can be processed over the catalysts of the present invention. It is preferred, however, to employ a trace of sulfur (10 to 100 p.p.m.) in order to reduce hydrocracking activity without hindering the hydrodealkylation activity of the catalyst.

The processing conditions for the hydrodealkylation reaction of the present invention include a temperature between about 1050 and 1200° F., a pressure between about 100 and 1000 p.s.i.g., a liquid hourly space velocity between about 0.1 and 5, and a hydrogen-to-hydrocarbon mole ratio of about 3 to 15/1.

In order to illustrate the hydrodealkylation ability of the catalysts of the present invention, a series of Runs was made in which toluene was hydrodealkylated at 1150° F., 500 p.s.i.g., 0.5 LHSV, and a 5:1 hydrogen to hydrocarbon ratio. The Table below gives the results of these Runs as compared with runs utilizing a commercial chromia-magnesia on alumina catalyst.

TABLE II

| Run | 8 | 9 |
|---|---|---|
| Catalyst | 12Cr-2Mg-Al$_2$O$_3$ | 1Pt-4Sn-Al$_2$O$_3$ |
| Product distribution: | | |
|   <Naphthalene | 37.8 | 39.9 |
|   Naphthalene | 59.0 | 52.1 |
|   Methylnaphthalene | 1.4 | 2.4 |
|   Dimethylnaphthalene | 2.9 | 5.6 |
| Wt. percent feed: MeN conversion | 90 | 86 |
| Carbon on catalyst: Wt. percent feed | 1.32 | 0.39 |

*a* See the following table:

| | Wt. percent |
|---|---|
| <Naphthalene | 50.4 |
| Naphthalene | 30.4 |
| Methylnaphthalene | 13.4 |
| Dimethylnaphthalene | 5.8 |
| >DMN | |

TABLE I

| Run | 1 | 2 | 3 | 4 | 5 | 6 | 7 |
|---|---|---|---|---|---|---|---|
| Catalyst | 12Cr-2Mg-Al$_2$O$_3$ | 1Rh-2Cs-2Sn-Al$_2$O$_3$ | 1Pd-2Cs-2Sn-Al$_2$O$_3$ | 1Pt-4Sn-Al$_2$O$_3$ | 1Pt-4Sn-Al$_2$O$_3$ | 1Rh-4Sn-Al$_2$O$_3$ | 1Ru-4Sn-Al$_2$O$_3$ |
| Feed: Sulfur, p.p.m. | | | | 130 | | | |
| Liquid recovery, vol. percent feed | 84 | 84 | 58 | 84 | 82 | 83 | 83.3 |
| Product distribution: | | | | | | | |
|   <Benzene | 0.8 | 0.7 | 0.2 | 0.8 | 0.5 | 0.8 | 0.3 |
|   Benzene | 66.8 | 66.7 | 90.3 | 74.0 | 71.6 | 73.5 | 39.5 |
|   Toluene | 32.4 | 32.6 | 7.3 | 25.2 | 27.9 | 25.7 | 60.2 |
| Wt. percent feed: | | | | | | | |
|   Toluene conversion | 72.8 | 72.7 | 95.8 | 78.8 | 77.2 | 78.7 | 46.9 |
|   Selectivity to benzene | 92 | 92 | 66 | 95 | 91 | 93 | 88 |
| Carbon on catalyst: wt. percent feed | 0.26 | 0.06 | 0.09 | 0.06 | 0.13 | 0.05 | 0 |

The chromia-magnesia catalyst used in the comparison is a commercial hydrodealkylation catalyst which is probably the most widely used in the industry. It is apparent, however, that catalysts of this invention result in higher conversion rates at comparable selectivities and have lower coking rates. The lower coking rates, of course, insures longer on-stream catalyst life and lower operating temperatures. The true coking rate of the commercial catalyst is not evident from the data. In actual practice, this catalyst is completely deactivated by coke within several days and to maintain conversion, operating temperatures must be raised to about 1300–1350° F. as the catalyst ages. Secondly, high hydrogen partial pressures must be maintained to control the increase in coking with elevation in operating temperatures. By contrast, the catalysts of the present invention maintain a low coking rate, conversion remains constant with carbon deposition on the catalyst, and lower hydrogen ratios can be utilized.

In other studies of the above catalysts, it was found that coal tar methylnaphthalene concentrates, as received from the coke oven, contain large amounts of resinous materials. However, by distilling these concentrates to yield a 90% overhead fraction, polymers, resins and free carbon may be removed as a bottoms fraction. By thus pretreating these concentrates, the carbon lay-down on the hydrodealkylation catalyst is further reduced and hydrogen consumption due to hydrocracking of the resins and polymers is reduced.

The following Table II illustrates the effect of a catalyst of the present invention as compared with a commercial chromia-magnesia catalyst when utilized in the hydrodealkylation of coal tar methylnaphthalenes. The conditions employed included a temperature of 1100° F., a pressure of 500 p.s.i.g., a liquid hourly space velocity of 0.5 and a hydrogen-to-hydrocarbon mole ratio of 5:1.

Table III shows the use of a catalyst of this invention on a different feed under the same conditions.

TABLE III

| Run | 10 |
|---|---|
| Catalyst | Pt-SnO-Al$_2$O |
| Feed: | |
|   Toluene | 51.6 |
|   Naphthalene | 48.3 |
|   Me Naphthalene | — |
|   Di Me Naphthalene | — |
| Product Distribution: | |
|   <Naphthalene | 52.4 |
|   Naphthalene | 47.3 |
|   Me Naphthalene | — |
|   Di Me Naphthalene | — |
| Carbon on Catalyst—Wt. Percent Feed | 0.22 |

The advantages of the process of the present invention are further illustrated by a series of tests conducted for the hydrodealkylation of toluene in the presence of the novel catalysts of the present invention. Specifically, in the tests set forth in the following Table, a noble metal was combined with lead in one instance and this catalyst thereafter had a rare earth metal added thereto in a second test.

TABLE IV

Conditions: 1,150° F., 500 p.s.i.g., 0.5 LHSV, 5/1 H$_2$/H'C
Feed: Toluene

| Run | 11 | 12 |
|---|---|---|
| Catalyst | 1 Pd-4 Pb Al$_2$O$_3$ | 1 Pd-1 Cs 4 Pb-Al$_2$O$_3$ |
| Liquid recovery, vol. percent feed | 81.5 | 85.0 |
| Product distribution: | | |
|   <Benzene | 0.5 | 0.3 |
|   Benzene | 54.2 | 48.1 |
|   Toluene | 46.3 | 51.6 |
| Wt. percent feed: | | |
|   Toluene conversion | 62.2 | 55.9 |
|   Selectivity to benzene | 85 | 88 |
| Carbon on catalyst: wt. percent feed | .095 | .003 |

Another hydrogen transfer process in which the novel catalysts of the present invention are highly successful is the dehydrogenation reaction. More specifically, the preferred process involves mono-olefin preparation by the dehydrogenation of corresponding paraffins. While this is a comparatively simple process, the on-stream time is generally very short, between about 7 to 15 minutes, and cyclic, adiabatic, fixed-bed reactors are necessary with frequent regeneration of the catalyst due to the coke laydown. For continuous operation, therefore, several reactors are required in parallel; one on-stream, one being regenerative and one on standby. Multiples of this arrangement can also be utilized.

Briefly, in accordance with this phase of the present invention, paraffins are dehydrogenated to produce olefins and hydrogen. Suitable feedstocks for use in accordance with the present invention include ethane, propane, normal butane, isobutane, normal pentane, iso-pentane, etc.

Processing conditions are dependent upon the feedstock employed. Generally, temperatures between about 900 and 1250° F., pressures between about 100 mm. and 2500 mm. mercury absolute, and liquid hourly space velocities from about 0.1 to 10 may be employed. More specifically, if ethane is the feedstock, the temperature should be between about 1100 and 1250° F. Where $C_3$ to $C_5$ paraffins are the feedstock, a temperature of 900 to 1150° F. should be used.

The effectiveness of the catalysts of the present invention is illustrated by the results set forth in the following Table wherein propane was dehydrogenated at 1110° F., 810 mm. mercury absolute, 5 LHSV and using an 88-minute cycle. Runs 11 through 14 show the results of Runs with unpromoted noble metal catalysts and runs 20 and 21 show other Group VIII metals of the ferrous group.

It is obvious from previous tests that the catalysts of the present invention give higher conversion rates, and equal or better selectivities with lower deactivation rates than the better of the commercial catalysts. These improved selectivities and deactivation rates appear to be due to the low coking rates of the catalysts of the present application. It is also to be observed from the previous Table that iron and cobalt showed no activity for the dehydrogenation reaction; hence, the ferrous group metals of the present invention are limited to nickel.

Another highly valuable reaction which can be carried out for the use of the novel catalyst of the present invention is a combined hydrogenation-hydrotreating operation. In this area, nickel molybdate and cobalt molybdate on alumina are generally used for hydrogenation-denitrogenation or hydrogenation-desulfurization, respectively. While these catalysts are, in essence, hydrotreating catalysts, their activity is therefore principally the removal of sulfur and nitrogen contaminants and to a lesser extent, hydrogenation. On the other hand, an excellent hydrogenation catalyst is platinum deposited on alumina. However, this catalyst is easily poisoned by the impurities which are to be removed by the previously mentioned catalysts; namely, sulfur, nitrogen, etc. Therefore, in the past, it has been necessary to utilize several catalytic treatments in order to effect hydrogenation-hydrotreating. In accordance with the present invention, it has been found that the improved catalysts of this invention are highly effective for hydrogenation-hydrotreating to simultaneously hydrogenate unsaturates and remove contaminants such as sulfur, nitrogen, etc., and that such catalysts have a low coking rate.

Feedstocks which may be processed over the catalysts of the present invention in a hydrogenation-hydrotreating operation include petroleum hydrocarbons from crude oil such as naphthas, kerosene, light and heavy cycle oils, gas oils, residuals, asphalts, etc.; shale oil derived fractions; liquids derived from the pyrolysis or carbonization of coal, such as coal tar liquids, and liquids obtained from the solvent extraction of coal.

TABLE V

| Run | 13 | 14 | 15 | 16 | 17 | 18 | 19 | 20 | 21 | 22 | 23 |
|---|---|---|---|---|---|---|---|---|---|---|---|
| Catalyst | 0.5 Pt-0.5 Ru $Al_2O_3$ | 0.6 Pt-1 Pd $Al_2O_3$ | 0.6 Pt-0.5 Rh $Al_2O_3$ | 0.6 Pt $Al_2O_3$ | 1 Rh-4 Sn $Al_2O_3$ | 1 Pt-2 Cs 4 Sn-$Al_2O_3$ | 5 Ni-2 K 4 Sn-$Al_2O_3$ | 10 Ni-2 K 4 Sn-$Al_2O_3$ | 10 Ni-4 Sn $Al_2O_3$ | 10 Co-2 K 4 Sn-$Al_2O_3$ | 10 Fe-2 K 4 Sn-$Al_2O_3$ |
| Conversion | 11.7 | 13.5 | 15.1 | 13.3 | 15.4 | 12.5 | 20.5 | 18.2 | 24.0 | No activity | |
| Selectivity | 75.3 | 62.2 | 71.1 | 75.6 | 93.5 | 90 | 92.5 | 94.8 | 91.3 | | |
| ΔConversion | 0 | 3.6 | 5.3 | 9.8 | 0 | 0 | 0 | 0.5 | 6.4 | | |
| Gm. coke: 20 g. catalyst | 0.22 | 0.41 | 0.63 | 0.38 | 0.27 | | 0.16 | 0.25 | 0.08 | | |
| Mole percent: | | | | | | | | | | | |
| $H_2$ | 14.3 | 14.6 | 15.9 | 14.5 | 17.6 | 15.3 | 19.1 | 19.2 | 22.6 | | |
| Methane | 1.1 | 2.0 | 1.7 | 1.3 | 0.4 | 0.5 | 0.6 | 0.4 | 0.8 | | |
| Ethane | 1.1 | 2.0 | 1.7 | 1.3 | 0.4 | 0.5 | 0.6 | 0.4 | 0.8 | | |
| $H_2$ purity | 85 | 73 | 79 | 82 | 95.5 | 93.5 | 93.7 | 95.9 | 93.2 | | |

Suitable conditions for the operation of the hydrogenation-hydrotreating process of the present invention include a temperature of about 500 to 900° F., a pressure of about 100 to 3000 p.s.i.g., a liquid hourly space velocity between about 0.1 and 10, and a hydrogen-to-hydrocarbon mole ratio of about 3 to 15/1.

When reference is made herein to the Periodic System of elements, the particular groupings referred to are as set forth in the Periodic Chart of the Elements in "The Merck Index," Seventh Edition, Merck & Co., Inc., 1960.

We claim:

1. A catalyst composition consisting essentially of between about 0.5 and about 5 percent by weight of nickel oxide and a promoting amount of lead oxide, both deposited on an inert oxide support.

2. A catalyst in accordance with claim 1 wherein the inert oxide support is a gamma alumina.

3. A catalyst composition consisting essentially of between about 0.5 and about 5 percent by weight of an oxide of a metal selected from the group consisting of ruthenium, rhodium, palladium and nickel, and promoting amounts of lead oxide and of an oxide a metal selected from the group consisting of potassium, rubidium, cesium, calcium, strontium, barium, cerium, thorium, and mixtures thereof, all deposited on an inert oxide support.

References Cited

UNITED STATES PATENTS

| | | | |
|---|---|---|---|
| 2,999,074 | 9/1961 | Bloch et al. | 252—442 |
| 3,480,053 | 11/1969 | Mulaskey | 252—466 J |
| 3,531,543 | 9/1970 | Cuppinger et al. | 252—466 J |
| 3,682,118 | 8/1972 | Mulaskey | 252—466 J |
| 3,425,792 | 2/1969 | Stephens | 252—466 J |
| 3,580,970 | 5/1971 | Swift | 252—466 J |

FOREIGN PATENTS

| | | | |
|---|---|---|---|
| 1,003,499 | 9/1965 | Great Britain | 252—466 PT |

DANIEL E. WYMAN, Primary Examiner

W. J. SHINE, Assistant Examiner

U.S. Cl. X.R.

252—459, 466 J, 466 PT, 472, 473, 474